US012731293B2

(12) United States Patent
Manila et al.

(10) Patent No.: US 12,731,293 B2
(45) Date of Patent: Sep. 8, 2026

(54) SYSTEMS AND METHODS FOR DATA COMPRESSION

(71) Applicant: Valeo Comfort and Driving Assistance, Creteil (FR)

(72) Inventors: Anushalakshmi Manila, San Mateo, CA (US); Jaime Almeida, San Mateo, CA (US)

(73) Assignee: Valeo Comfort and Driving Assistance (FR)

( * ) Notice: Subject to any disclaimer, the term of this patent is extended or adjusted under 35 U.S.C. 154(b) by 280 days.

(21) Appl. No.: 18/231,389

(22) Filed: Aug. 8, 2023

(65) Prior Publication Data

US 2025/0054193 A1 Feb. 13, 2025

(51) Int. Cl.
*G06T 9/00* (2006.01)
*G06T 7/10* (2017.01)
*G06V 20/56* (2022.01)
*G06V 20/70* (2022.01)

(52) U.S. Cl.
CPC .................. *G06T 9/00* (2013.01); *G06T 7/10* (2017.01); *G06V 20/56* (2022.01); *G06V 20/70* (2022.01)

(58) Field of Classification Search
None
See application file for complete search history.

(56) References Cited

U.S. PATENT DOCUMENTS 5,048,099 A * 9/1991 Lee .................... G06V 30/1429 382/175
5,093,869 A * 3/1992 Alves .................. G06V 10/426 382/199
5,719,969 A * 2/1998 Taguchi ................ G06V 10/98 382/311
6,580,813 B1 * 6/2003 Hermanns ............. G01N 21/94 242/118
8,254,686 B2 * 8/2012 He ........................ G06V 30/36 382/187
8,320,675 B1 * 11/2012 Silver .................. G06V 10/752 382/209
9,054,876 B1 * 6/2015 Yagnik ................. G06V 10/464
10,452,926 B2 10/2019 Brueckner et al.

(Continued)

FOREIGN PATENT DOCUMENTS

EP 3722992 A1 10/2020

OTHER PUBLICATIONS

Shapiro, Linda; Stockman, George, "Computer Vision", Chapter 10, Mar. 2000. (Year: 2000).*

(Continued)

*Primary Examiner* — Sath V Perungavoor
(74) *Attorney, Agent, or Firm* — Dickinson Wright PLLC

(57) ABSTRACT

A method includes assigning a first label to pixels associated with a first portion of at least one image, assigning a second label to pixels associated with a second portion of the at least one image, and assigning a third label to pixels not assigned the first label or the second label. The method also includes identifying, for each segment on a first axis associated with the at least one image: a first pixel on a second axis corresponding to the first portion; and a second pixel on the second axis corresponding to the second portion. The method also includes generating a compressed image file based on the first pixel and the second pixel for each segment on the first axis.

14 Claims, 6 Drawing Sheets

(56) References Cited

U.S. PATENT DOCUMENTS

| | | | | |
|---|---|---|---|---|
| 11,080,861 | B2 | 8/2021 | Bradski et al. | |
| 11,594,036 | B2 | 2/2023 | Golov | |
| 2005/0089191 | A1* | 4/2005 | Yamaguchi | G01N 15/147 382/133 |
| 2005/0125368 | A1* | 6/2005 | Akahori | G06N 20/00 706/12 |
| 2008/0137961 | A1* | 6/2008 | Ishida | G06V 10/469 382/199 |
| 2012/0093401 | A1 | 4/2012 | Tsunematsu | |
| 2012/0134547 | A1* | 5/2012 | Jung | G06V 20/59 382/118 |
| 2012/0162525 | A1* | 6/2012 | Schoner | H04N 19/86 348/607 |
| 2016/0247290 | A1* | 8/2016 | Liu | G06V 20/56 |
| 2022/0237402 | A1 | 7/2022 | Unnikrishnan et al. | |

OTHER PUBLICATIONS

PCT ISR and Written Opinion from corresponding PCT patent application PCT/US2024/040333, Oct. 31, 2024, 12 pgs.

J. Wu, C. Wu, Y. Lin, T. Yoshinaga, L. Zhong, X. Chen, Y. Ji, Semantic Segmentation-Based Semantic Communication System for Image Transmission, Digital Communications and Networks (2023), doi: https://doi.org/10.1016/j.dcan.2023-02.006.

* cited by examiner

SYSTEMS AND METHODS FOR DATA COMPRESSION

TECHNICAL FIELD

The present disclosure relates to data compression, and in particular to systems and methods for compressing image data.

BACKGROUND

Vehicles, such as cars, trucks, sport utility vehicles, crossover vehicles, mini-vans, all-terrain vehicles, recreational vehicles, watercraft vehicles, aircraft vehicles, or other suitable vehicles are increasingly utilizing image capturing devices, such as image sensors, cameras, light-detection and ranging sensors, radio-detection and ranging sensors, and the like. Such image capturing devices may be disposed on the exterior and/or in the interior of a vehicle and may be capture image data of an environment of the vehicle (e.g., including an internal environment, such as a vehicle interior, and an external environment being traversed or surrounding the vehicle).

SUMMARY

An aspect of the disclosed embodiments includes a method for compressing image data. The method includes receiving image data including at least one image that includes at least a first portion and a second portion, assigning a first label to pixels associated with the first portion of the at least one image, assigning a second label to pixels associated with the second portion of the at least one image, and assigning a third label to pixels not assigned the first label or the second label. The method also includes identifying, for each segment on a first axis associated with the at least one image: a first pixel on a second axis corresponding to the first portion of the at least one image, where the first pixel includes the first label and being adjacent on the second axis to a pixel including one of the second label and the third label; and a second pixel on the second axis corresponding to the second portion of the at least one image, where the second pixel includes the second label and being adjacent on the second axis to a pixel including one of the first label and the third label. The method also includes generating a compressed image file based on the first pixel for each segment on the first axis and the second pixel for each segment on the first axis.

Another aspect of the disclosed embodiments includes a system for compressing image data. The system includes a processor and a memory. The memory includes instructions that, when executed by the processor, cause the processor to: receive image data including at least one image that includes at least a first portion and a second portion; assign a first label to pixels associated with the first portion of the at least one image; assign a second label to pixels associated with the second portion of the at least one image; assign a third label to pixels not assigned the first label or the second label; identify, for each segment on a first axis associated with the at least one image: a first pixel on a second axis corresponding to the first portion of the at least one image, the first pixel including the first label and being adjacent on the second axis to a pixel including one of the second label and the third label; and a second pixel on the second axis corresponding to the second portion of the at least one image, the second pixel including the second label and being adjacent on the second axis to a pixel including one of the first label and the third label; and generate a compressed image file based on the first pixel for each segment on the first axis and the second pixel for each segment on the first axis.

Another aspect of the disclosed embodiments includes an apparatus for compressing image data. The apparatus includes a vehicle controller configured to: assign a first label to pixels of a first portion of at least one image; assign a second label to pixels of a second portion of the at least one image; assign a third label to pixels of portions of the at least one image other than the first portion of the at least one image and the second portion of the at least one image; identify, for each segment on a first axis associated with the at least one image: a first pixel on a second axis corresponding to the first portion of the at least one image, the first pixel including the first label and being adjacent on the second axis to a pixel including one of the second label and the third label; and a second pixel on the second axis corresponding to the second portion of the at least one image, the second pixel including the second label and being adjacent on the second axis to a pixel including one of the first label and the third label; and generate a compressed image file based on the first pixel for each segment on the first axis and the second pixel for each segment on the first axis.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
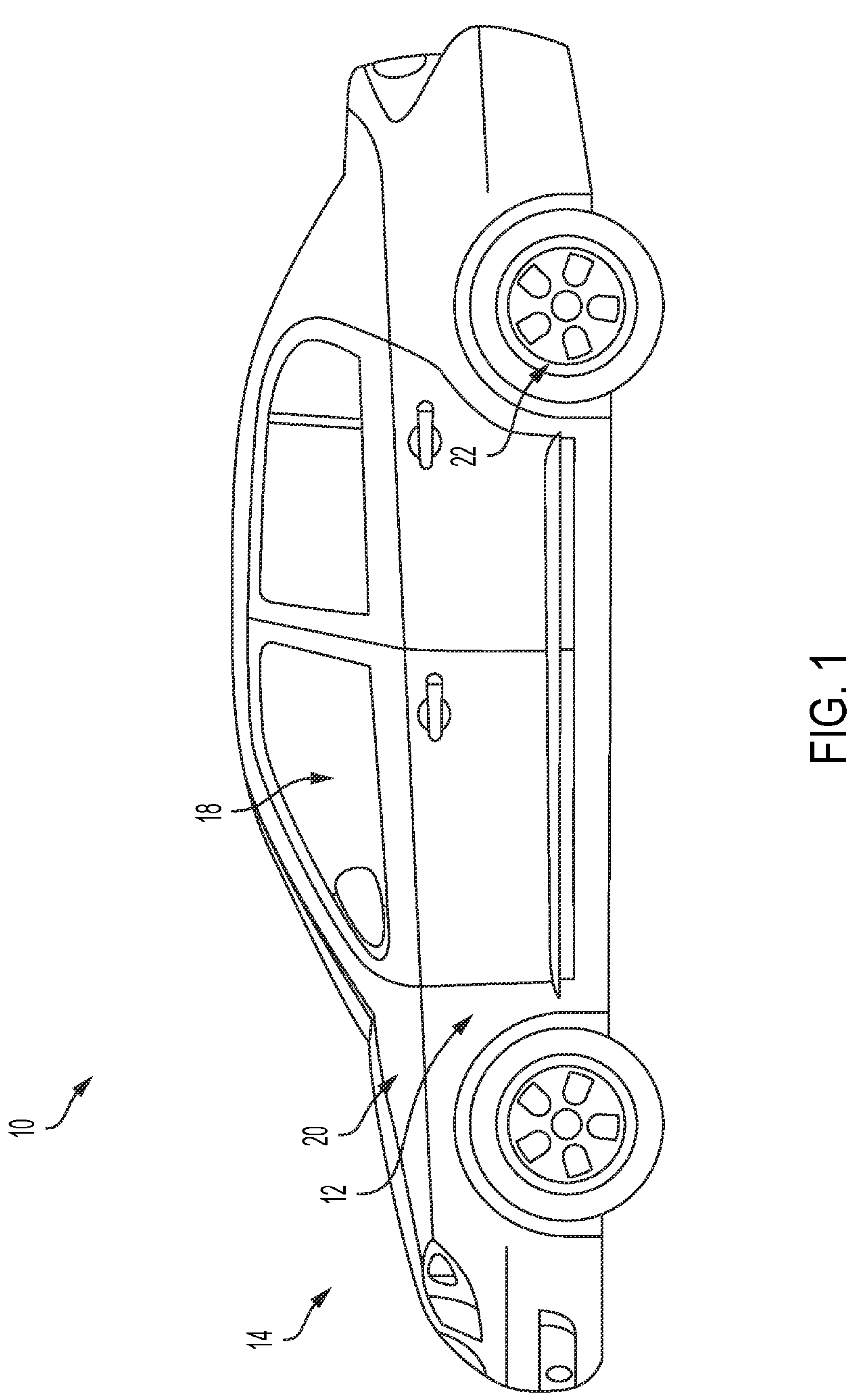
FIG. 1 generally illustrates a vehicle according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described, vehicles, such as cars, trucks, sport utility vehicles, crossover vehicles, mini-vans, all-terrain vehicles, recreational vehicles, watercraft vehicles, aircraft vehicles, or other suitable vehicles are increasingly utilizing image capturing devices, such as image sensors, cameras, light-detection and ranging sensors, radio-detection and ranging sensors, and the like. Such image capturing devices may be disposed on the exterior and/or in the interior of a vehicle and may be capture image data of an environment of the vehicle (e.g., including an internal environment, such as a vehicle interior, and an external environment being traversed or surrounding the vehicle).

Such image data may be used for providing a rendering of the vehicle in the environment of the image data on a display within the vehicle (e.g., or other suitable display), for generating autonomous or semi-autonomous vehicle control data, for identifying pedestrians and/or other features of the image data, for use in a gaming system (e.g., to render real world objects or locations and/or to render fictional objects or locations), and/or any other suitable use.

Typically, an image file associated with such image data may have a relatively large data footprint. For example, a semantic segmentation process may be used to assign a label to every pixel in an image of the image data. As such, for an image having a width of 1920 and a height of 1080, each frame will have 2073600 values (e.g., where width*height=2073600). When such a frame is serialized, the resulting file size may be as large as 12.5 megabytes (MB) per frame. In some scenarios, such as when data segmentation is performed on image data comprising portions of sky and ground (e.g., or other suitable image data), the file size per frame may be too large for transmission to a receiving computing device.

Accordingly, systems and methods, such as the systems and methods described herein, configured to compress image data to reduce per frame file size, may be desirable. In some embodiments, the systems and methods described herein may be configured to provide image data post processing to distinguish between regions of interest (ROI) and regions of non-interest (RONI) based on semantic segmentation, which may allow for improved data storage, improved data storage, and improved data loading.

In some embodiments, the systems and methods described herein may be configured to provide, by way of non-limiting example, a game development kit using ground segmentation of the image data to define a game board and sky segmentation of the image data for spawning three-dimensional (3D) assets. The systems and methods described herein may be configured to, for each pixel location of each frame of the image data, determine whether a pixel is associated with the sky, ground, or something other than the sky or ground. In some embodiments, the systems and methods described herein may be configured to determine, for each frame of the image data, y-axis coordinate values (e.g., referred to herein as Y1 and Y2) for each x-axis value, where Y1 includes a pixel on the y-axis indicating where either the sky ends or the ground begins and Y2 includes a pixel on the y-axis indicating the other of either the sky ending or the ground beginning.

In some embodiments, the systems and methods described herein may be configured to receive image data including at least one image that includes at least a first portion and a second portion. The at least one image includes a height and a width. The height may be at least three pixels (e.g., or any suitable number of pixels or height value) and the width may be any suitable number of pixels and/or width value. The at least one image may be captured using any suitable device or sensor, including an image capturing device and/or any other device or sensor including, but not limited to those described herein. In some embodiments, the image capturing device may be disposed on, or associated with, a vehicle. It should be understood that, while a vehicle is described, the image data may be associated with any suitable application and/or the image capturing device may be associated with any suitable mechanism, location, system, and the like.

In some embodiments, the at least one image corresponds to an environment associated with the vehicle. It should be understood that, while the at least one image is described as including or corresponding to an environment of the vehicle, the at least one image may be associated with, correspond to, and/or include any subject, including, instead of, and/or in addition to those described herein. In some embodiments, the first portion of the at least one image may correspond to or include a portion of sky of the environment of the vehicle in the at least one image. The second portion of the at least one image may correspond to or include a portion of ground of the environment of the vehicle in the at least one image.

The systems and methods described herein may be configured to assign a first label to pixels associated with the first portion of the at least one image. The systems and methods described herein may be configured to assign a second label to pixels associated with the second portion of the at least one image. The systems and methods described herein may be configured to assign a third label to pixels not assigned the first label or the second label.

The systems and methods described herein may be configured to identify, for each segment on a first axis associated with the at least one image a first pixel on a second axis corresponding to the first portion of the at least one image. The first axis may correspond to a width (e.g., and the x-axis of an image frame) of the at least one image. The first pixel may include the first label and may be adjacent on the second axis to a pixel including one of the second label and the third label. The systems and methods described herein may be configured to identify a second pixel on the second axis corresponding to the second portion of the at least one image. The second pixel may include the second label and may be adjacent on the second axis to a pixel including one of the first label and the third label. The second axis may correspond to a height (e.g., a he y-axis of the image frame) of the at least one image.

The systems and methods described herein may be configured to generate a compressed image file based on the first pixel for each segment on the first axis and the second pixel for each segment on the first axis. The compressed image file includes a height and width. The height of the compressed image file may include two pixels and the width of the compressed image file may include the width of the at least one image. In some embodiments, each pixel of the height of the compressed image file corresponds to a coordinate value on the second axis of the at least one image.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels 22 and for use on roads, the principles of the present disclosure may apply to other vehicles, such as planes, boats, trains, drones, or other suitable vehicles. The vehicle 10 may include any level of automation, such that the vehicle 10 may comprise no automation or may comprise a semi-autonomous vehicle or autonomous vehicle. It should be understood that, while a vehicle is provided as an example application of the systems and methods described herein, the systems and methods described herein may be applied to any suitable application, including, but not limited to, virtual assistants, home automation systems, and the like.

The vehicle 10 includes a vehicle body 12, a hood 14, and a passenger compartment 18 at least partially defined by the vehicle body 12. The hood 14 may be moveably attached to a portion of the vehicle body 12, such that the hood 14 provides access to an engine compartment 20. In some embodiments, the engine compartment 20 may be disposed in a rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system (e.g., house at least partially within the engine compartment 20) including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. Additionally, or alternatively, propulsion controls, such as an accelerator actuator (e.g., an accelerator pedal), a brake actuator (e.g., a brake pedal), a steering wheel, and other such components are disposed in the passenger compartment 18. The propulsion controls may be actuated or controlled by a driver of the vehicle 10 and may be directly connected to corresponding components of the propulsion system, such as a throttle, a brake, a vehicle axle, a vehicle transmission, and the like, respectively.

In some embodiments, the vehicle 10 includes a transmission that may include a manual transmission, an automatic transmission, and the like. The vehicle 10 may include one or more pistons, in the case of an internal combustion engine or a hybrid vehicle, which cooperatively operate with a crankshaft to generate force, which is translated through the transmission to one or more axles, which turns wheels 22. When the vehicle 10 includes one or more electric motors, one or more vehicle batteries and/or one or more fuel cells provide energy to the electric motors to turn the wheels 22.

In some embodiments, the vehicle 10 may include a suitable communication network, such as a controller area network (CAN) comprising a CAN bus or other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
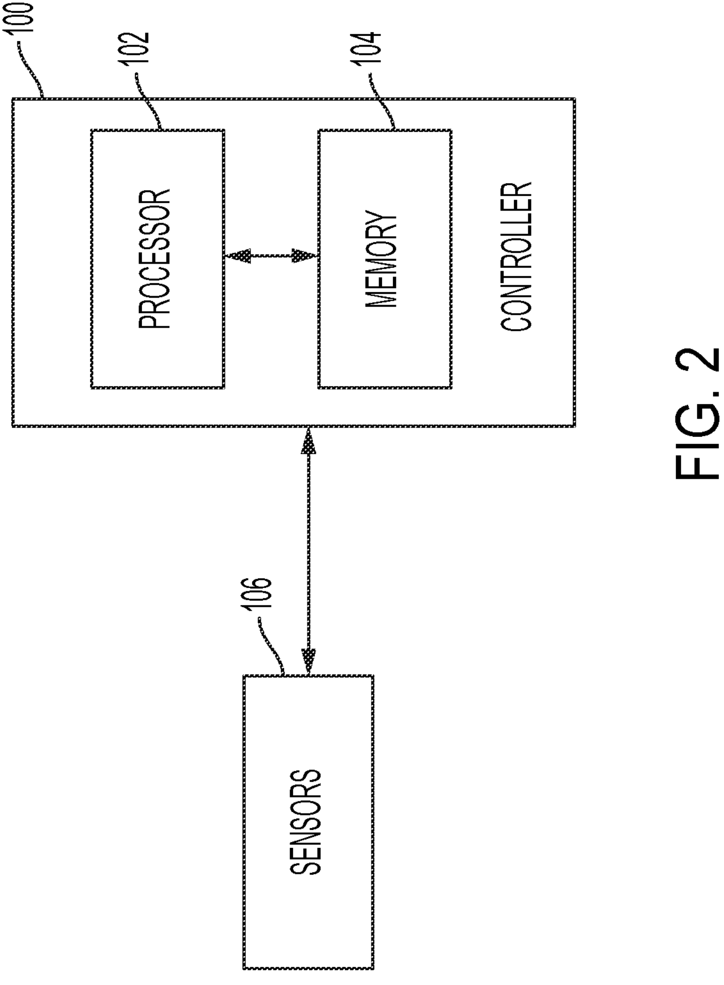
FIG. 2 generally illustrates a vehicle controller according to the principles of the present disclosure.

In some embodiments, the steering system may include a controller, such as controller 100, as is generally illustrated in FIG. 2. The controller 100 may include any suitable controller. The controller 100 may be configured to control, for example, the various functions of the vehicle systems described herein. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the vehicle 10 and/or any other suitable function, including those of the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more motor position sensors or devices, one or more image capturing sensors or devices, one or more audio capturing sensors or devices, other suitable sensors or devices, or a combination thereof. The one or more signals may indicate a vehicle speed, image data corresponding to an environment of the vehicle 10, audio data associated with the environment or other aspects of the vehicle 10, other suitable information, or a combination thereof.

In some embodiments, the controller 100 may be configured to compress data, such as image data. For example, the controller 100 may receive image data including at least one image, such as an image 300 generally illustrated in FIG. 3, which includes at least a first portion 302 (e.g., including a portion of the sky in the image 300) and a second portion 304 (e.g., a portion of the ground in the image 300). The image 300 includes a height (e.g., illustrated as being along the y-axis and being 1080 pixels) and a width (e.g., illustrated as being along the x-axis and being 1920 pixels). It should be understood that the image 300 or other suitable image may include any suitable height and width. The at least one image may be captured using any suitable device or sensor, including, but not limited to, the sensor 106 of the vehicle 10. The image 300 may include an environment of the vehicle 10, as is generally illustrated. However, it should be understood that the image 300 or other suitable image may include any suitable subject. Additionally, or alternatively, the image 300 and/or the image data may be received from any suitable source including one or more computing devices remotely located from the vehicle 10 and/or retrieved from any suitable location within the vehicle 10 and/or remotely located from the vehicle 10.

Figure 3:
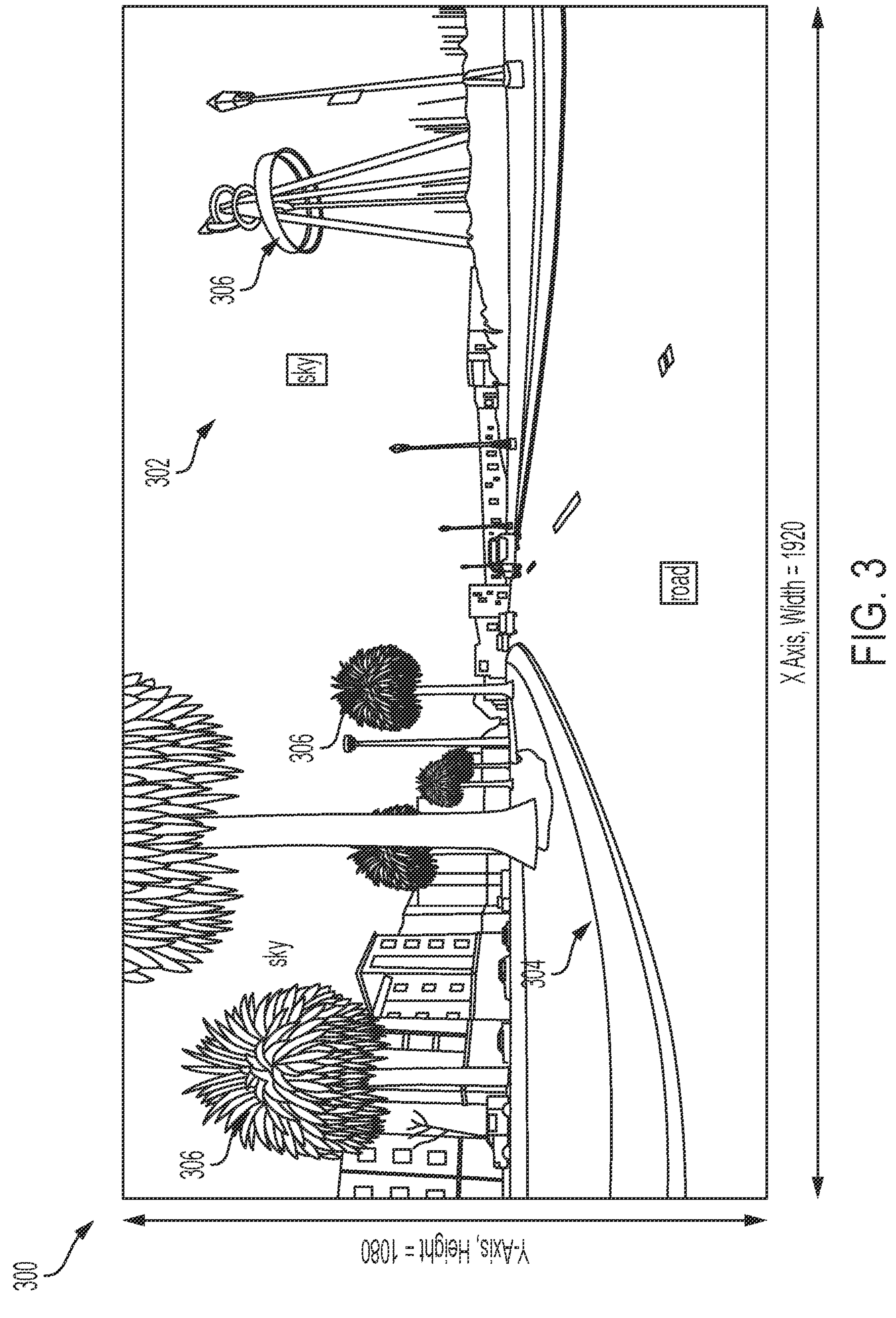
FIG. 3 generally illustrates an image of an environment according to the principles of the present disclosure.
Figure 4A:
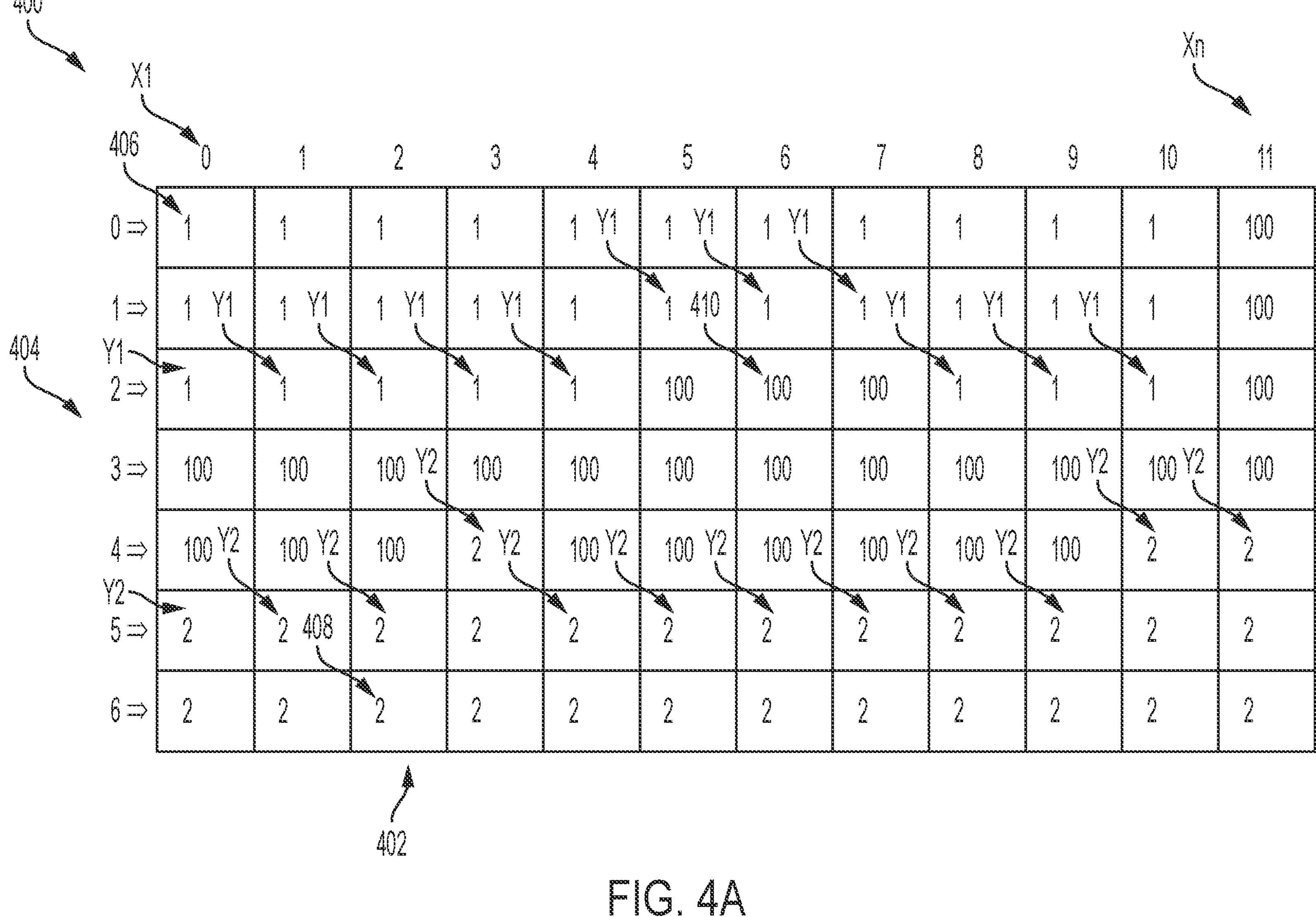
FIG. 4A generally illustrates a pixel chart for an image according to the principles of the present disclosure.

As is generally illustrated in FIG. 4A, the controller 100 may be configured to generate a pixel map or chart 400 for the image 300 having a first axis 402 and a second axis 404. For example, the controller 100 may assign labels to the portions of the image 300. The controller 100 may assign a first label 406 (e.g., illustrated as a '1') to pixels associated with the first portion 302 of the image 300. The controller 100 may assign a second label 408 (e.g., illustrated as a '2') to pixels associated with the second portion 304 of the image 300. The controller 100 may assign a third label 410 (e.g., illustrated as '100') to pixels not assigned the first label or the second label. For example, as is generally illustrated in FIG. 3, portions 306 of the image 300 may include objects other than the sky or the ground. The controller 100 may assign portions 306 the third label 410.

The controller 100 may identify, for each segment on the first axis 402 a first pixel (Y1) on the second axis 404 corresponding to the first portion 302 of the image 300. For example, the first axis may be divided into segments X1-Xn, where each of X1-Xn is the width of a pixel. The first pixel Y1 for the first segment X1 may include the first label 406 and may be adjacent on the second axis 404 to a pixel including one of the second label 408 and the third label 410. The controller 100 may identify a second pixel (Y2) on the second axis 404 corresponding to the second portion 304 of the image 300. The second pixel Y2 may include the second label 408 and may be adjacent on the second axis 404 to a pixel including one of the first label 406 and the third label 410. The first pixel Y1 may correspond to a coordinate on the second axis 404 for a respective segment on the first axis 402 and the second pixel Y2 may correspond to another coordinate on the second axis 404 for the respective segment on the first axis 402. The controller 100 may identify corresponding Y1 value and Y2 values for each segment X1-Xn.

Figure 4B:
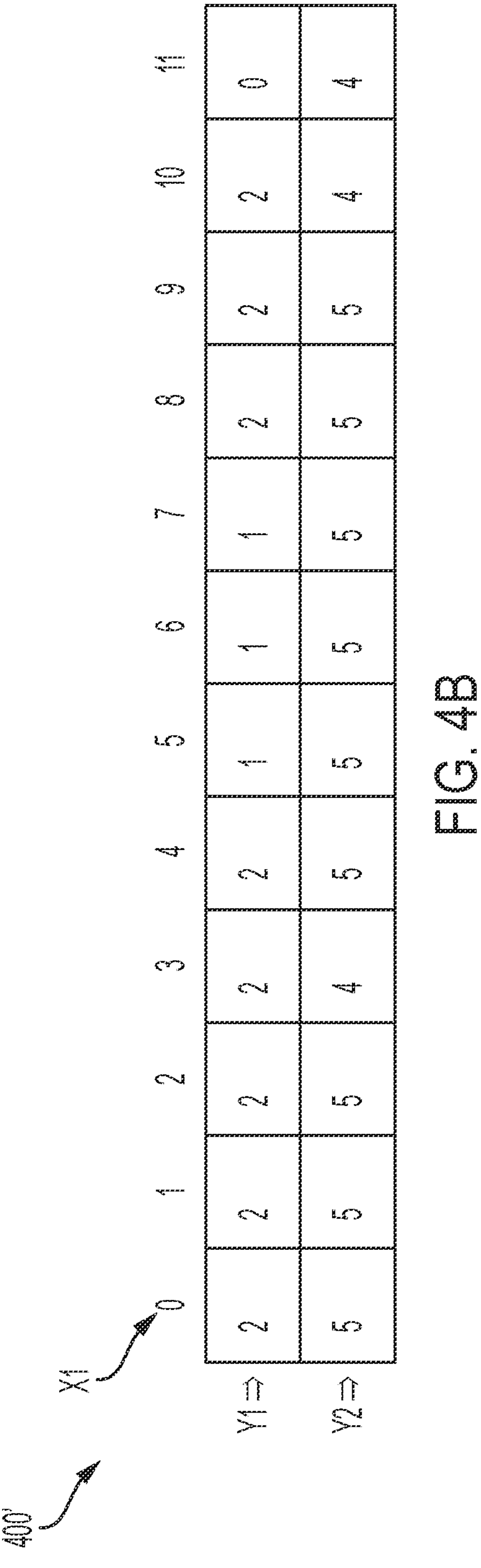
FIG. 4B generally illustrates a compressed pixel chart for an image according to the principles of the present disclosure.

As is generally illustrated in FIG. 4B, the controller 100 may generate a compressed image file 400' based on the first pixel Y1 for each segment X1-Xn on the first axis 402 and the second pixel Y2 for each segment X1-Xn on the first axis 402. The compressed image file 400' includes a height and width. The height of the compressed image file 400' may include two pixels (e.g., Y1 and Y2) and the width of the compressed image file may include the width of the image 300 (e.g., including segments X1-Xn). In some embodiments, each pixel of the height of the compressed image file corresponds to a coordinate value on the second axis 404 of the image 300. For example, Y1 for segment X1 may have a value of 2 indicating the third pixel from the top of the image 300 at the segment X1 and Y2 for segment X1 may have a value of 5 indicating the sixth pixel from the top of the image 300 at the segment X1.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 5:
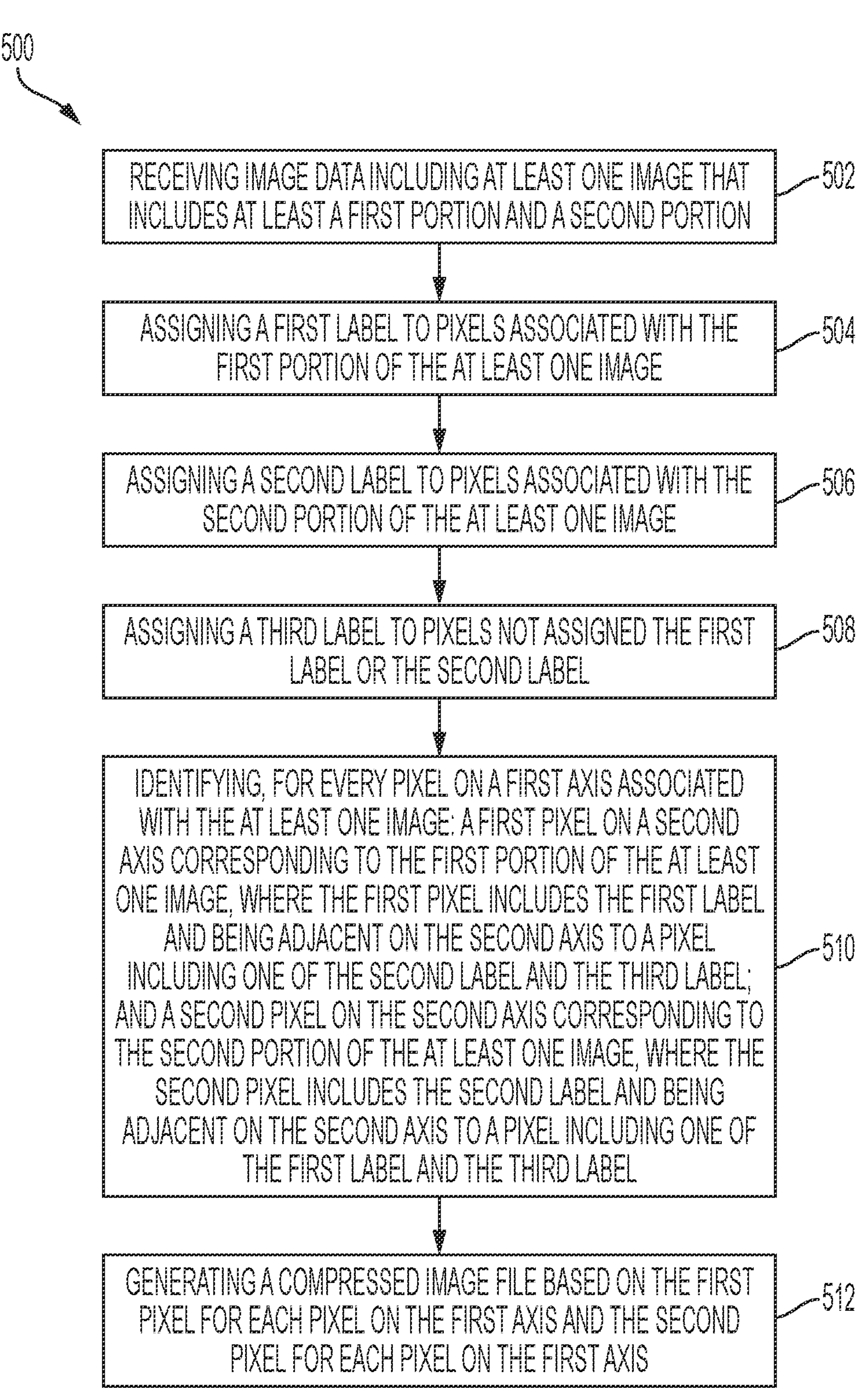
FIG. 5 generally illustrates a flow diagram of a data compression method according to the principles of the present disclosure.

FIG. 5 is a flow diagram generally illustrating a data compression method 500 according to the principles of the present disclosure. At 502, the method 500 receives image data including at least one image that includes at least a first portion and a second portion. For example, the controller 100 may receive the image data including the image 300, which includes the first portion 302 and the second portion 304.

At 504, the method 500 assigns a first label to pixels associated with the first portion of the at least one image. For example, the controller 100 may assign the first label 406 to pixels associated with the first portion 302 of the image 300.

At 506, the method 500 assigns a second label to pixels associated with the second portion of the at least one image. For example, the controller 100 may assign the second label 408 to pixels associated with the second portion 304 of the image 300.

At 508, the method 500 assigns a third label to pixels not associated with the first label or the second label. For example, the controller 100 may assign the third label 410 to pixels not associated with the first label 406 and the second label 408.

At 510, the method 500 identifies, for each segment on a first axis associated with the at least one image: (i) a first pixel on a second axis corresponding to the first portion of the at least one image, where the first pixel includes the first label and is adjacent on the second axis to a pixel including one of the second label and the third label; and (ii) a second pixel on the second axis corresponding to the second portion of the at least one image, where the second pixel includes the second label and is adjacent on the second axis to a pixel including one of the first label and the third label. For example, the controller 100 may identify, for each segment X1-Xn on the first axis 402 associated with the image 300: (i) the first pixel Y1 on the second axis 404 corresponding to the first portion 302 of the image 300, where he first pixel Y1 may include the first label 406 and may be adjacent on the second axis 404 to a pixel including one of the second label 408 and the third label 410; and (ii) the second pixel Y2 on the second axis 404 corresponding to the second portion 304 of the image 300, where the second pixel Y2 may include the second label 408 and may be adjacent on the second axis 404 to a pixel including one of the first label 406 and the third label 410.

At 512, the method 500 generates a compressed image file based on the first pixel for each segment on the first axis and the second pixel for each segment on the first axis. For example, the controller 100 may generate the compressed image file 400' based on the first pixel Y1 for each segment X1-Xn on the first axis 402 and the second pixel Y2 for each segment X1-Xn on the first axis 402.

Clause 1. A method for compressing image data, the method comprising: receiving image data including at least one image that includes at least a first portion and a second portion; assigning a first label to pixels associated with the first portion of the at least one image; assigning a second label to pixels associated with the second portion of the at least one image; assigning a third label to pixels not assigned the first label or the second label; identifying, for each segment on a first axis associated with the at least one image: a first pixel on a second axis corresponding to the first portion of the at least one image, the first pixel including the first label and being adjacent on the second axis to a pixel including one of the second label and the third label; and a second pixel on the second axis corresponding to the second portion of the at least one image, the second pixel including the second label and being adjacent on the second axis to a pixel including one of the first label and the third label; and generating a compressed image file based on the first pixel for each segment on the first axis and the second pixel for each segment on the first axis.

Clause 2. The method of any of the clauses herein, wherein the first axis corresponds to a width of the at least one image.

Clause 3. The method of any of the clauses herein, wherein the second axis corresponds to a height of the at least one image.

Clause 4. The method of any of the clauses herein, wherein the at least one image includes a height and a width, and wherein the height is at least three pixels.

Clause 5. The method of any of the clauses herein, wherein the compressed image file includes a height and width, and wherein the height of the compressed image file is two pixels and the width of the compressed image file is the width of the at least one image.

Clause 6. The method of any of the clauses herein, wherein each segment of height of the compressed image file corresponds to a coordinate value on the second axis of the at least one image.

Clause 7. The method of any of the clauses herein, wherein the at least one image is captured using an image capturing device.

Clause 8. The method of any of the clauses herein, wherein the image capturing device is associated with a vehicle.

Clause 9. The method of any of the clauses herein, wherein the at least one image corresponds to an environment associated with the vehicle.

Clause 10. The method of any of the clauses herein, wherein the first portion of the at least one image corresponds to a portion of sky of the environment of the vehicle in the at least one image and the second portion of the at least one image corresponds to a portion of ground of the environment of the vehicle in the at least one image.

Clause 11. A system for compressing image data, the system comprising: a processor; and a memory including instructions that, when executed by the processor, cause the processor to: receive image data including at least one image that includes at least a first portion and a second portion; assign a first label to pixels associated with the first portion of the at least one image; assign a second label to pixels associated with the second portion of the at least one image; assign a third label to pixels not assigned the first label or the second label; identify, for each segment on a first axis associated with the at least one image: a first pixel on a second axis corresponding to the first portion of the at least one image, the first pixel including the first label and being adjacent on the second axis to a pixel including one of the second label and the third label; and a second pixel on the second axis corresponding to the second portion of the at least one image, the second pixel including the second label and being adjacent on the second axis to a pixel including one of the first label and the third label; and generate a compressed image file based on the first pixel for each segment on the first axis and the second pixel for each segment on the first axis.

Clause 12. The method of any of the clauses herein, wherein the first axis corresponds to a width of the at least one image.

Clause 13. The method of any of the clauses herein, wherein the second axis corresponds to a height of the at least one image.

Clause 14. The method of any of the clauses herein, wherein the at least one image includes a height and a width, and wherein the height is at least three pixels.

Clause 15. The method of any of the clauses herein, wherein the compressed image file includes a height and width, and wherein the height of the compressed image file is two pixels and the width of the compressed image file is the width of the at least one image.

Clause 16. The method of any of the clauses herein, wherein each pixel of height of the compressed image file corresponds to a coordinate value on the second axis of the at least one image.

Clause 17. The method of any of the clauses herein, wherein the at least one image is captured using an image capturing device.

Clause 18. The method of any of the clauses herein, wherein the image capturing device is associated with a vehicle.

Clause 19. The method of any of the clauses herein, wherein the at least one image corresponds to an environment associated with the vehicle.

Clause 20. An apparatus for compressing image data, the apparatus comprising: a vehicle controller configured to: assign a first label to pixels of a first portion of at least one image; assign a second label to pixels of a second portion of the at least one image; assign a third label to pixels of portions of the at least one image other than the first portion of the at least one image and the second portion of the at least one image; identify, for each segment on a first axis associated with the at least one image: a first pixel on a second axis corresponding to the first portion of the at least one image, the first pixel including the first label and being adjacent on the second axis to a pixel including one of the second label and the third label; and a second pixel on the second axis corresponding to the second portion of the at least one image, the second pixel including the second label and being adjacent on the second axis to a pixel including one of the first label and the third label; and generate a compressed image file based on the first pixel for each segment on the first axis and the second pixel for each segment on the first axis.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for compressing image data, the method comprising:

- receiving image data including at least one image that includes at least a first portion and a second portion;
- assigning a first label to pixels associated with the first portion of the at least one image;
- assigning a second label to pixels associated with the second portion of the at least one image;
- assigning a third label to pixels not assigned the first label or the second label;
- identifying, for each segment on an x-axis associated with a width of the at least one image:
  - a first pixel on a y-axis corresponding to the first portion of the at least one image, the first pixel including the first label and being adjacent on the y-axis to a pixel including one of the second label and the third label;
  - a first pixel y-axis coordinate value corresponding to a position of the first pixel on the y-axis in a direction from a top of the at least one image to a bottom of the at least one image;
  - a second pixel on the y-axis corresponding to the second portion of the at least one image, the second pixel including the second label and being adjacent on the y-axis to a pixel including one of the first label and the third label; and
  - a second pixel y-axis coordinate value corresponding to a position of the second pixel on the y-axis in the direction from the top of the at least one image to the bottom of the at least one image; and
- generating a compressed image file that includes two rows of pixels, wherein, each row is of a length that corresponds to the width of the at least one image;
- wherein pixel values in a first row of the two rows of pixels is a list of the first pixel y-axis coordinate values along the width of the at least one image, and
- wherein pixel values in a second row of the two rows of pixels is a list of the second pixel y-axis coordinate values along the width of the at least one image.

2. The method of claim 1, wherein the y-axis corresponds to a height of the at least one image.

3. The method of claim 1, wherein the at least one image includes a height, and wherein the height is at least three pixels.

4. The method of claim 1, wherein the at least one image is captured using an image capturing device.

5. The method of claim 4, wherein the image capturing device is associated with a vehicle.

6. The method of claim 5, wherein the at least one image corresponds to an environment associated with the vehicle.

7. The method of claim 6, wherein the first portion of the at least one image corresponds to a portion of sky of the environment of the vehicle in the at least one image and the second portion of the at least one image corresponds to a portion of ground of the environment of the vehicle in the at least one image.

8. A system for compressing image data, the system comprising:

- a processor; and
- a memory including instructions that, when executed by the processor, cause the processor to:
- receive image data including at least one image that includes at least a first portion and a second portion;
- assign a first label to pixels associated with the first portion of the at least one image;
- assign a second label to pixels associated with the second portion of the at least one image;
- assign a third label to pixels not assigned the first label or the second label;
- identify, for each segment on an x-axis associated with a width of the at least one image:
  - a first pixel on a y-axis corresponding to the first portion of the at least one image, the first pixel including the first label and being adjacent on the y-axis to a pixel including one of the second label and the third label;
  - a first pixel y-axis coordinate value corresponding to a position of the first pixel on the y-axis in a direction from a top of the at least one image to a bottom of the at least one image,
  - a second pixel on the y-axis corresponding to the second portion of the at least one image, the second pixel including the second label and being adjacent on the y-axis to a pixel including one of the first label and the third label; and
  - a second pixel y-axis coordinate value corresponding to a position of the second pixel on the y-axis in the direction from the top of the at least one image to the bottom of the at least one image; and
- generate a compressed image file that includes two rows of pixels, wherein each row is a length that corresponds to the width of the at least one image;

wherein pixel values in a first row of the two rows of pixels is a list of the first pixel y-axis coordinate values along the width of the at least one image; and wherein pixel values in a second row of the two rows of pixels is a list of the second pixel y-axis coordinate values along the width of the at least one image.

9. The system of claim 8, wherein the y-axis corresponds to a height of the at least one image.

10. The system of claim 8, wherein the at least one image includes a height, and wherein the height is at least three pixels.

11. The system of claim 8, wherein the at least one image is captured using an image capturing device.

12. The system of claim 11, wherein the image capturing device is associated with a vehicle.

13. The system of claim 12, wherein the at least one image corresponds to an environment associated with the vehicle.

14. An apparatus for compressing image data, the apparatus comprising:

a vehicle controller configured to:

assign a first label to pixels of a first portion of at least one image;

assign a second label to pixels of a second portion of the at least one image;

assign a third label to pixels of portions of the at least one image other than the first portion of the at least one image and the second portion of the at least one image;

identify, for each segment on an x-axis associated with a width of the at least one image:

a first pixel on a y-axis corresponding to the first portion of the at least one image, the first pixel including the first label and being adjacent on the y-axis to a pixel including one of the second label and the third label;

a first pixel y-axis coordinate value corresponding to a position of the first pixel on the y-axis in a direction from a top of the at least one image to a bottom of the at least one image;

a second pixel on the y-axis corresponding to the second portion of the at least one image, the second pixel including the second label and being adjacent on the y-axis to a pixel including one of the first label and the third label; and a second pixel y-axis coordinate value corresponding to a position of the second pixel on the y-axis in the direction from the top of the at least one image to the bottom of the at least one image; and generate a compressed image file that includes two rows of pixels, wherein: each row is of a length that corresponds to the width of the at least one image, wherein pixel values in a first row of the two rows of pixels is a list of the first pixel y-axis coordinate values along the width of the at least one image; and wherein pixel values in a second row of the two rows of pixels is a list of the second pixel y-axis coordinate values along the width of the at least one image.

* * * * *